United States Patent [19]
Chun

[11] Patent Number: 6,053,641
[45] Date of Patent: Apr. 25, 2000

[54] FIBER PIGTAIL FOR OPTICAL COMMUNICATION MODULE

[75] Inventor: Sung-Hak Chun, Ich'on, Rep. of Korea

[73] Assignee: Hyundai Electronics Industries Co., Rep. of Korea

[21] Appl. No.: 08/999,150

[22] Filed: Dec. 29, 1997

[30] Foreign Application Priority Data

Dec. 30, 1996 [KR] Rep. of Korea ..................... 96-77822

[51] Int. Cl.[7] ..................................................... G02B 6/36
[52] U.S. Cl. ............................................... 385/93; 385/88
[58] Field of Search ........................... 385/88, 89, 90–94

[56] References Cited

U.S. PATENT DOCUMENTS

| | | | |
|---|---|---|---|
| 5,073,047 | 12/1991 | Suzuki et al. | 385/93 |
| 5,107,537 | 4/1992 | Schriks et al. | 385/93 |
| 5,127,074 | 6/1992 | Watanabe et al. | 385/93 |
| 5,347,604 | 9/1994 | Go et al. | 385/92 |
| 5,537,503 | 7/1996 | Tojo et al. | 385/93 |
| 5,751,877 | 5/1998 | Ishizaka et al. | 385/93 |

FOREIGN PATENT DOCUMENTS

| | | |
|---|---|---|
| 62-196620 | 8/1987 | Japan . |
| 1-133009 | 5/1989 | Japan . |
| 3-92610 | 9/1991 | Japan . |

*Primary Examiner*—Hemang Sanghavi
*Attorney, Agent, or Firm*—Ware, Fressola, Van der Sluys & Adolphson LLP

[57] ABSTRACT

The present invention is to provide a fiber pigtail for optical communication modules. According to the presnent invention, there is provided a fiber pigtail for an optical communication module, comprising: an optical device being set on a header and generating light; a ball lens cap being set on the header with sealing the optical device and having a ball lens focusing the light generated from the optical device; a first cylindrical ferrule fixed on the header to surround the outer portion of the ball lens cap; a second ferrule fixed to the first ferrule and having a hole which is in communication with a hole of the first ferrule; and a fiber ferrule inserted and fixed in the hole of the second ferrule and having an optical fiber coupling the light irradiated from the optical device, wherein the optical fiber includes a DFB laser diode, and the ferrules each is fixed at its three points in three directions perpendicular to an optical axis of the optical fiber. In addition, the optical device is 1.3 $\mu$m DFB laser diode, and each of the ferrules are fixed by laser welding at three points in X, Y and Z directions perpendicular to an optical axis of the optical fiber wherein components of X, Y and Z direction have an angle of about 120° to each other.

2 Claims, 3 Drawing Sheets

FIBER PIGTAIL FOR OPTICAL COMMUNICATION MODULE

BACKGROUND OF THE INVENTION

1. Field of the Invention

The present invention relates to an optical module, and more particularly to a fiber pigtail for optical communication system.

2. Description of Related Art

As a telecommunication method, an optical communication system is in practical use, which transmits a wide bandwidth of signal according to an intensity modulation or frequency modulation by the medium of spatial transmission, optical fiber cable, optical lens guide and optical beam guide, employing light as a carrier wave. In this optical communication system, a fiber pigtail is used for converting an input electrical signal into an optical signal, and transmitting it.

In the fiber pigtail, an electric circuit including an optical device (light emitting device and light receiving device), and an optical fiber for transmitting or extracting an optical signal to/from the optical device are coupled so as to form a single unit. The optical device is fabricated in a package, and a ferrule is used for protecting the optical device package and connecting it with other elements. Here, as the light-emitting device, a laser diode of 1.3 $\mu$m Fabry perot (FP) is, generally, used and the ferrule is connected to the other elements by welding.

However, since the aforementioned conventional fiber pigtail type FP laser diode has a lower transmission speed of 155 Mbps, it is not suitable for an optical communication module for long-distance transmission. Furthermore, since the ferrule is fixed by 2-point welding, it is difficult to fix the ferrule at the optimal location for the optical axis of the laser diode. This deteriorates the optical coupling efficiency between the laser diode and the optical fiber.

SUMMARY OF THE INVENTION

An object of the present invention is to provide a fiber pigtail for optical communication modules, which is suitable for an optical communication module for long-distance transmission, and improves the optical coupling efficiency between an optical device and an optical fiber.

To accomplish the object of the present invention, there is provided a fiber pigtail for an optical communication module, comprising: an optical device being set on a header and generating light; a ball lens cap being set on the header with sealing the optical device and having a ball lens focusing the light generated from the optical device; a first cylindrical ferrule fixed on the header to surround the outer portion of the ball lens cap; a second ferrule fixed to the first ferrule and having a hole which is in communication with a hole of the first ferrule; and a fiber ferrule inserted and fixed in the hole of the second ferrule and having an optical fiber coupling the light irradiated from the optical device, wherein the optical fiber includes a DFB laser diode, and the ferrules each is fixed at its three points in three directions perpendicular to an optical axis of the optical fiber.

In a preferred embodiment of the present invention, the optical device is 1.3 $\mu$m DFB laser diode, and each of the ferrules are fixed by laser welding at three points in X, Y and Z directions perpendicular to an optical axis of the optical fiber wherein components of X, Y and Z direction have an angle of about 120° to each other.

According to the present invention, the optical device and the fiber are coupled to each other by the ferrule, to form a single unit. At three points in X, Y, and Z directions, the first ferrule is fixed to the header, the second ferrule is fixed to the first ferrule, and the fiber ferrule is fixed to the second ferrule, by laser welding. That is, each of the ferrules is fixed by three-point laser welding, so that the fiber and the second ferrule are fixed to the optimal locations without dislocation. Accordingly, the optical coupling efficiency between the laser diode and optical fiber is improved. Furthermore, DFB laser diode is used, to make a long-distance transmission of an optical communication system possible.

BRIEF DESCRIPTION OF THE ATTACHED DRAWINGS

FIGS. 1A to 11D are cross-sectional views showing a method of fabricating a fiber pigtail for an optical communication module according to an embodiment of the present invention.

DETAILED DESCRIPTION OF PREFERRED EMBODIMENT

Hereinafter, a preferred embodiment of the present invention will be explained in more detail with reference to the accompanying drawings.

FIGS. 1A to 1D are cross-sectional views showing a method of fabricating a fiber pigtail for an optical communication module according to an embodiment of the present invention.

Figure 1A:
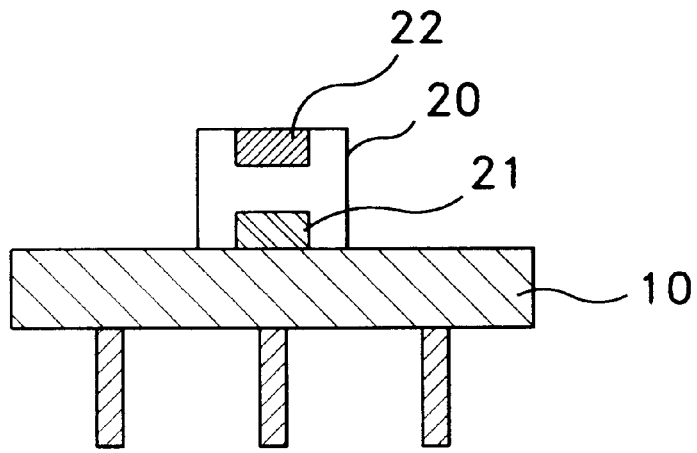

Referring to FIG. 1A, an optical device 20 including a light receiving portion and a light emitting portion is fixed to the center of a header 10 acting as a support. The optical device 20 includes a monitor photodiode 21 as the light-receiving portion, and laser diode 22, preferably, 1.3 $\mu$m distributed feedback (DFB) laser diode, as the light-emitting portion for generating an optical signal. The DFB laser diode has high transmission speed of 2.5 Gbps, which is suitable for an optical communication modules for long-distance transmission.

Figure 1B:
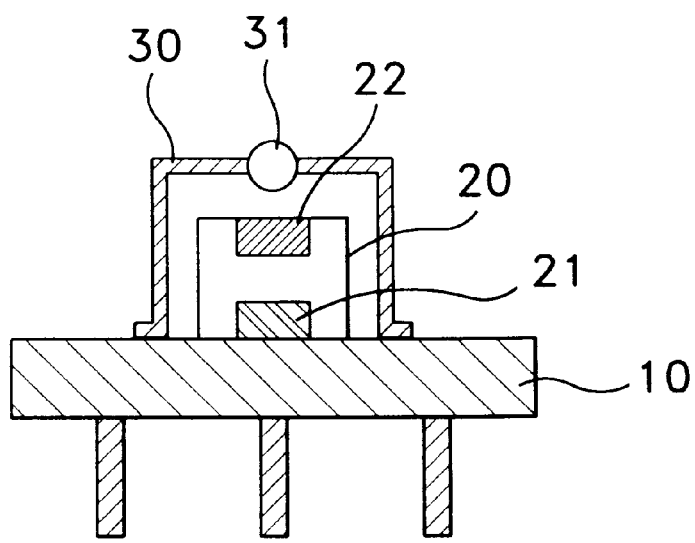
Figure 1C:
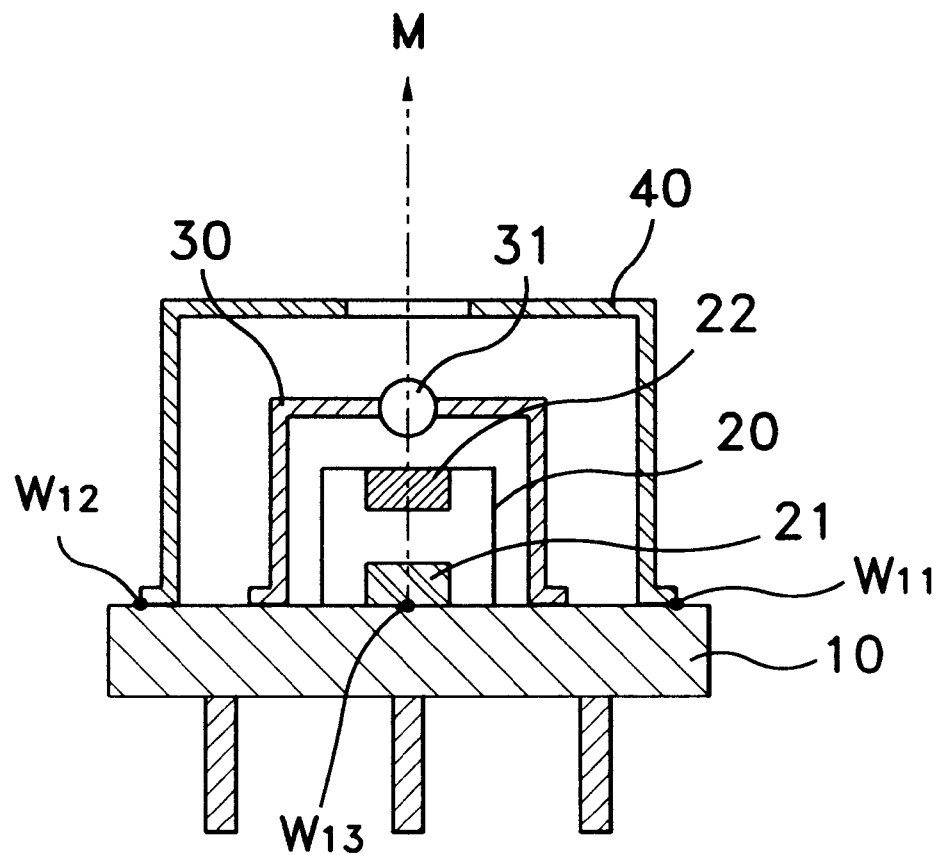
Figure 1C:
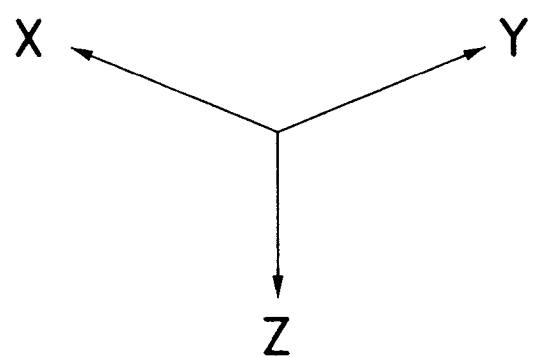

Referring to FIG. 1B, to prevent the deterioration of the performance of optical device 20, a ball lens cap 30 having a ball lens 31 at its center is fixed on a header 10 with sealing the optical device by hermetic sealing. Referring to FIG. 1C, a first cylindrical ferrule 40 is installed so as to surround the outer portion of the ball lens cap 30. The first ferrule 40 is separated from the ball lens cap 30 with a predetermined distance. In addition, the first ferrule 40 is fixed by laser welding, at three points in three direction. In FIG. 1C, $W_{11}$, $W_{12}$ and $W_{13}$ show the welding points at three points in X, Y and Z directions perpendicular to an optical axis of the optical fiber M wherein X, Y and Z direction components have an angle of 120° to each other. The distance between the first ferrule 40 and the ball lens cap 30 is sufficient to couple an output optical source emitted from the laser diode 22 into an optical fiber to be formed later, after its pass through the ball lens 31.

Figure 1D:
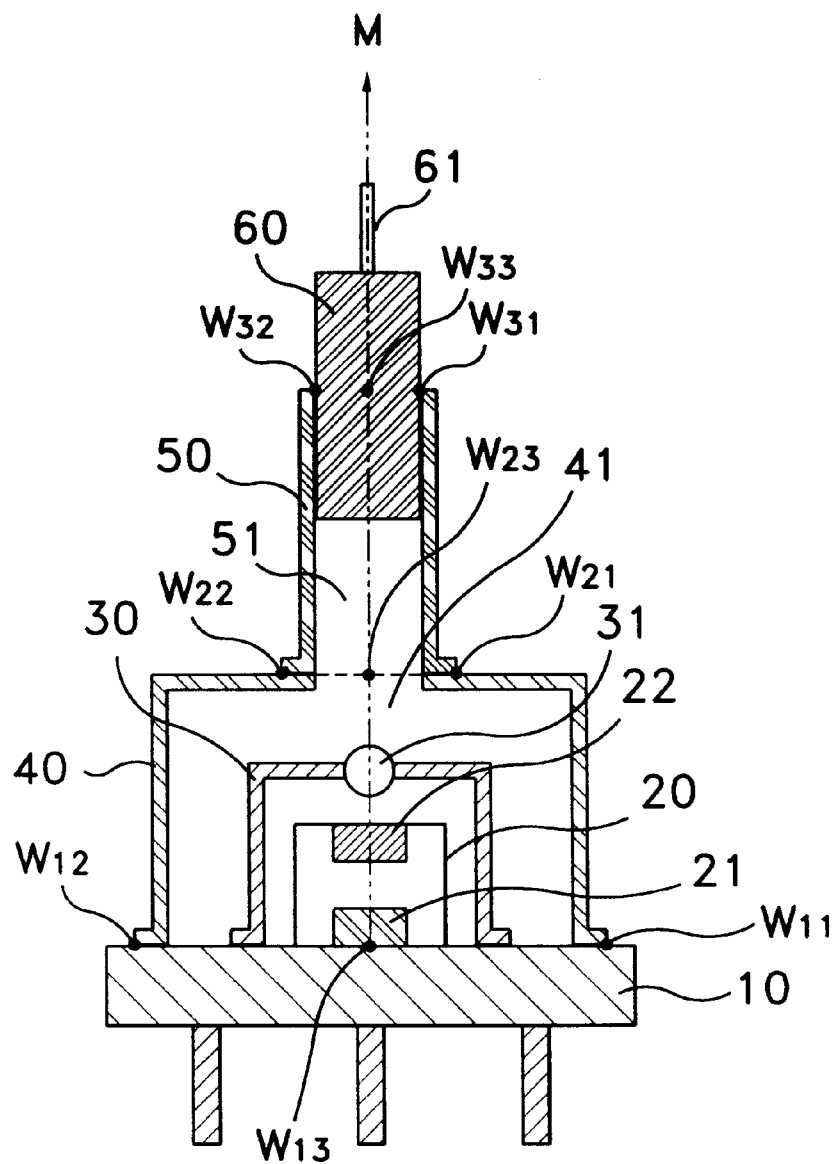
Figure 1D:
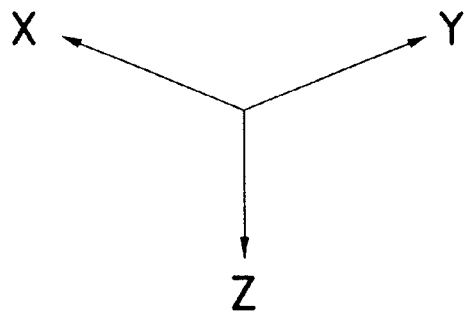

Referring to FIG. 1D, a second ferrule 50 having a hole 51 in communication with a hole 41 of the first ferrule 40 is aligned in X, Y and Z directions perpendicular to the optical axis of the optical fiber M, and fixed to the first ferrule 30 by laser welding at a point in the Z direction, first. A second ferrule 50 is then fixed to the first ferrule 30 by laser welding at two points in the X and Y directions. In FIG. 1D, $W_{21}$, $W_{22}$ and $W_{23}$ show the welding points at three points in X, Y and Z directions, respectively. Next, a fiber ferrule 60 to which an optical fiber 61 is set is inserted into the hole 51 of the second ferrule 50, and then fixed to the second ferrule 50 by laser welding at three points in the X, Y and Z directions. In addition, $W_{31}$, $W_{32}$ and $W_{33}$ also show the welding points at three points in X, Y and Z directions, respectively.

By doing so, light emitted from the laser diode 22 is focused on the ball lens 31, and then irradiated to the optical fiber 61 of the fiber ferrule 60 located within the focal distance via the hole 41 and 51 of the first and second ferrules 40 and 50, such that it is coupled to the optical fiber 61.

According to the embodiment of the present invention, the optical device (light emitting device and light receiveing device) and the fiber are coupled to each other by the ferrule, to form a single unit. At three points in X, Y, and Z directions, the first ferrule is fixed to the header, the second ferrule is fixed to the first ferrule, and the fiber ferrule is fixed to the second ferrule, by laser welding. That is, each ferrule is fixed by three-point laser welding, so that the fiber and ferrule are fixed to the optimal locations without dislocation. Accordingly, the optical coupling efficiency between the laser diode and optical fiber is improved. Furthermore, DFB laser diode is used, to make a long-distance transmission of the optical communication modules possible. Accordingly, it is possible to apply the fiber pigtail to various optical communication modules.

It will be apparent to those skilled in the art that various modifications and variations can be made in the fiber pigtail for optical communication modules of the present invention without departing from the spirit or scope of the invention. Thus, it is intended that the present invention cover the modifications and variations of this invention provided they come within the scope of the appended claims and their equivalents.

What is claimed is:

1. A fiber pigtail for an optical communication module, comprising:

an optical device being set on a header and generating light;

a ball lens cap being set on the header with sealing the optical device and having a ball lens focusing the light generated from the optical device;

a first cylindrical ferrule fixed on the header to surround an outer portion of the ball lens cap;

a second ferrule fixed to the first ferrule and having a hole which is in communication with a hole of the first ferrule; and a fiber ferrule inserted and fixed in the hole of the second ferrule and having an optical fiber coupling the light emitted from the optical device, wherein the optical device includes a DFB laser diode, and each of the ferrules is fixed by laser welding at three points in the X, Y and Z direction components perpendicular to an optical axis of the optical fiber, the X, Y and Z direction components having an angle of about 120 degrees to each other.

2. The fiber pigtail as claimed in claim 1, wherein the optical device is 1.3 $\mu$m DFB laser diode.

* * * * *

UNITED STATES PATENT AND TRADEMARK OFFICE
CERTIFICATE OF CORRECTION

PATENT NO : 6,053,641
DATED : April 25, 2000
INVENTOR(S) : S. Chun

It is certified that error appears in the above-identified patent and that said Letters Patent are hereby corrected as shown below:

At col. 2, line 14, please cancel "11D" and substitute --1D-- therefor.

Signed and Sealed this

Seventeenth Day of April, 2001

Attest:

NICHOLAS P. GODICI

Attesting Officer

Acting Director of the United States Patent and Trademark Office